United States Patent [19]

Sweeney, Jr.

[11] 4,353,019

[45] Oct. 5, 1982

[54] ADAPTIVE PULSING MOTOR CONTROL FOR POSITIONING SYSTEM

[75] Inventor: James S. Sweeney, Jr., Laguna Beach, Calif.

[73] Assignee: Unisen, Inc., Irvine, Calif.

[21] Appl. No.: 173,274

[22] Filed: Jul. 29, 1980

[51] Int. Cl.³ .............................................. G05B 11/18
[52] U.S. Cl. .................................. 318/594; 318/611; 318/599; 318/561; 318/592
[58] Field of Search ............... 318/561, 611, 590, 592, 318/594, 599, 616

[56] References Cited

U.S. PATENT DOCUMENTS

4,263,537  4/1981  Bettin et al. ........................ 318/616

Primary Examiner—Gene Z. Rubinson
Assistant Examiner—Eugene S. Indyk
Attorney, Agent, or Firm—Thomas J. Plante

[57] ABSTRACT

A motor control positioning apparatus and method are disclosed wherein variable duration pulses are fed to a DC motor. After the vicinity of the destination has been reached, the final pulsing stage is initiated, in which a short duration pulse is fed to the motor; position is then checked to determine if forward movement of the driven element has occured; and if movement has not occurred, the pulse duration is increased by an increment which is repeated until movement does occur. Thereupon a new series of such pulses is started; and this cycling continues until destination is reached.

26 Claims, 7 Drawing Figures

ADAPTIVE PULSE SEQUENCE IN THE ABSENCE OF MOVEMENT (TIME DOMAIN)

FIG.5

FOUR-SPEED APPROACH TO DESTINATION
(DISTANCE DOMAIN)

FIG.6

PROPORTIONAL APPROACH (4:1) AND ADAPTIVE PULSING (EXAMPLE)
(ASSUMING 0.001" POSITION RESOLUTION)

FIG.7

ADAPTIVE PULSING MOTOR CONTROL FOR POSITIONING SYSTEM

BACKGROUND OF THE INVENTION

This invention relates to an adaptive pulsing system for controlling a motor, which moves a machine or other device accurately to a preselected new position. The invention is useful wherever precise control of position is desired and is particularly useful if "overshoot" correction is a problem. There are many uses for control systems of this type, but one of the primary reasons for development of the present invention relates to problems inherent in devices moved by lead screws. Lead screw driven devices have a "backlash" problem if the position feedback information is derived from measurement of the lead screw rotation rather than measurement of the position of the element driven by the lead screw. If the movement of the device in the initial direction leads to an "overshoot", the corrective motion in the reverse direction has an unacceptable hysteresis, or margin of error, because of the backlash in the lead screw driving mechanism. Therefore, the aim in such a mechanism is to cause the device to "settle into" its final position by means of movement in one direction only, and to always move into its final position from the same direction.

While the problem of hysteresis, or position inaccuracy due to "hunting", can be at least partially avoided by direct measurement of the location of the element whose position is being changed, this is often highly impractical and excessively expensive. For one thing, the distance measurement must be continuous, and must relate to a specific starting point. In other words, continuous base point to end measurement is required. If large distances are to be covered, as on a large machine table, a highly accurate, direct measurement of the moving element is extremely difficult. For this reason, it is very desirable to use lead screw measurement to determine position.

The problem of inaccuracy due to hunting also arises wherever there is "slack", or elasticity, in the driving system, if it is desired to measure position from the position of the driving mechanism. Such elasticity or slack exists in belt-driven systems, geared drives, fluid couplings, and the like.

In Sweeney et al. Application Ser. No. 62,416, filed July 31, 1979, titled "Digital Motor Control for Positioning System", a control apparatus and method are disclosed which provide a significant advance in solving the problems discussed above. The system of that application uses a shaft encoder to provide distance-representing signals which cause a driving motor to be turned on and off in accordance with incremental distance demands. In the preferred version shown in that application, the distance demands are reduced incrementally during the final stage of the positioning movement, the size of subsequent distance increments being automatically determined as a function of the remaining distance to destination. Because of the digital nature of the control system, the increments used are generally either one-half, one-fourth or one-eighth of the remaining distance.

The position control system of Ser. No. 62,416 has been highly successful, but experience has demonstrated that even greater positioning accuracy is desirable. If the size of the decreasing increment is too large, the system may "overshoot" the destination in a certain percentage of runs. On the other hand, if the size of the decreasing increment is made smaller, in order to avoid overshoot, the position accuracy is diminished. For example, a decreasing increment of one-half of the remaining distance may cause overshoot due to the momentum of the machine. If the size of the decreasing increment is reduced to one-fourth of the remaining difference, the tolerance of the final accuracy will be approximately four times the measurement resolution of which the system is capable. In other words, if the system has a potential accuracy of one mil, any remaining distance after the last pulse which is less than four mils will not cause generation of a further (one mil) pulse.

If overshoot does occur in a given application, due to use of too large an approach increment, the result may be oscillation, because the overshoot returns the machine to the approach mode, and it is possible to set up an alternating sequence of overshoot and return movements. In order to avoid any overshoot problem, some installations of the system disclosed in application Ser. No. 62,416 have used a one-eighth approach increment. In general, it can be stated that any system which tends to develop oscillation back and forth across the destination point will have to sacrifice some accuracy in order to solve the oscillation problem.

Where a stepper motor control is used to provide a series of equal, pulse-controlled steps, for the purpose of attaining accuracy and avoiding overshoot, the costs are very high. A relatively large stepper motor is usually necessary in order to overcome friction in the machine; and the stepper motor constitutes an extra, final stage in addition to other means for moving the machine to the beginning of the final stage. Another problem in stepper motor systems is that the larger stepper motors, in particular, have torque requirements which make it very difficult to move them precisely.

In general, the purpose of the present invention is to eliminate the shortcomings of the earlier systems by (a) providing much greater accuracy in reaching the destination, (b) adapting automatically to varying frictional and inertial loading of the driven element, and (c) preventing oscillation due to overshoot. These advantages are applicable to any position control system, and are in no way limited to the system disclosed in Ser. No. 62,416. The present invention will, however, normally be used as the final, precise positioning stage in a system wherein the apparatus disclosed in Ser. No. 62,416, or some other known apparatus, is used to bring the driven element very close to its destination.

Certain other shortcomings of the positioning system disclosed in Ser. No. 62,416 are also dealt with in the present invention. The earlier application showed an AC motor as the pulse-controlled driver for the driven element. Experience has shown that such a system had inherent limitations. One was a limit on the timing accuracy, or precision, obtainable in turning the motor on and off, which made it impossible for such a system to fully utilize the potential accuracy attainable by using the present invention. Another such limitation was the difficulty of varying motor speed over a wide range, because the AC motor speed must be adjusted by varying frequency; and therefore it would not usually be feasible to use a single AC motor to provide both the fast and slow stages of the approach procedure.

Another shortcoming of the system disclosed in Ser. No. 62,416 was the inclusion of a clutch between the slow-speed AC motor and the driven element. The time required for engagement and disengagement of the clutch was far greater than the duration of the pulses utilized in the present invention, thereby rendering the precision of the present system largely inapplicable to the installations which included clutches in the driving structure.

SUMMARY OF THE INVENTION

The present invention which, like that of Ser. No. 62,416, relates to a new adaptive pulsing technique for final settling, differs from that application in that it utilizes actuating pulses which vary in duration (rather than distance); and it begins with a very short pulse and then increases the pulse duration if the previous pulse fails to move the driven element forward.

In other words, the present invention, which is intended to accomplish the final approach (e.g., after the operation disclosed in Ser. No. 62,416 has been completed), first provides a timed pulse of very short duration, then determines whether the driven element has moved from its pre-pulse position, and if it has not moved provides a second pulse longer than the first by a predetermined time. This succession of pulsing, checking position, and then pulsing slightly longer if the position has not changed, is continued until the position of the moved element does change. Once its position changes, the sequence begins again with the shortest pulse. This control technique provides a "nudging" effect which creates a minimum amount of momentum, thereby avoiding overshoot.

The invention also includes the possibility of setting a target for each "cycle" of pulses (from shorter to longer duration) which target is slightly beyond the pre-pulse position. In other words, the "nudging" technique is applicable whether or not the next target position is identical with the previously attained position of the driven element.

Another aspect of the present invention is the use of a DC motor to move the driven element, under the control of the new pulsing technique described above. The use of a DC motor has important advantages over an AC motor: (a) it permits the timed drive pulsing increments to be as small as desired; (b) it permits the speed and torque characteristics to be easily optimized by varying the applied voltage; and (c) it permits a single motor to be used for the entire approach by shifting speeds as a function of voltage changes.

BRIEF DESCRIPTION OF THE DRAWINGS

FIGS. 4–6 are pulse diagrams showing the sequence of pulses in the system.

DETAILED DESCRIPTION OF SPECIFIC EMBODIMENTS

The positioning system incorporating the present invention combines means for measuring the position of the driven element in digital terms, a digital computer together with its program memory, means for communicating to the computer a destination position of the driven element, and means responsive to signals from the computer capable of moving the driven element.

In one embodiment of the invention, the moved element is driven by rotation of a lead screw, to which a shaft encoder and a permanent-magnet DC motor are coupled. The signal output of the shaft encoder is transmitted to the interface circuitry, whereby a digital representation of the position of the driven element is derived and made available to the computer. The computer is provided with a display and a keyboard for entry of destination positions, and a read/write memory in which sequences of positions are stored, for automatic operation of the apparatus. The computer has three signal outputs for control of the motor by means of the drive circuitry. Two speeds, fast and slow, are available, and the motor may be driven at either speed in a forward or reverse direction.

The method of reaching the final stage in the approach to the destination is as follows: If the driven element is ahead of the destination, it is driven in reverse at high speed until the destination is passed. If the driven element is far enough behind the destination for the fast speed to be used in the forward direction, it is driven at high speed toward the destination and stopped far enough away from the destination to assure that it will not overshoot. Similarly, the driven element is then moved at slow speed toward the destination and stopped far enough away to assure that it will not overshoot. From this position it is driven at slow speed over a fraction of the remaining distance and stopped; this latter procedure is repeated until the remaining distance is less than 0.016". At this point the variable duration adaptive pulsing technique is applied.

The position of the driven element is stored in memory, and a brief command signal pulse is applied to the motor (or rather to the slow speed drive circuit). The base length of the pulse is chosen to be less than or equal to the minimum required to produce measurable motion of the driven element. One typical base pulse width is three milliseconds. After the pulse is output, a relatively long delay is observed, for example, fifty milliseconds, then position is measured. If the driven element has not measurably moved forward, the motor command signal pulse width is increased by some increment, such as three milliseconds, the delay is again observed, position is measured, and if forward motion is still not observed, the command signal pulse width is again incremented, and so forth.

(Under certain circumstances it may be desirable to set an upper bound to the pulse width attainable by this process. If an exogenous force is applied to the driven element, causing it to move backward against the direction in which the motor forces are applied, the pulse width attained when the original position is regained may be far in excess of the minimum required for motion.)

Once the original position has been passed, the position measured at the end of the long delay is stored as the next position to be passed, and the process is repeated, starting with the original base pulse width, until the destination is achieved. In some situations, it may be decided to set each new target, or next position to be passed, slightly ahead of the measured position.

Subject to limitations in the speed of response of the motor drive to pulse inputs, it is possible to control the position of the driven element to within the resolution of measurement of position. It will be seen that with a careful choice of base pulse width, pulse width increment, and length of delay, a destination may be approached and achieved without overshoot, regardless of variation in frictional forces along the approach path.

A practical limit to the accuracy attainable by this technique (neglecting inaccuracies in the measurement of position) is the desire to have the driven element achieve its destination in the least possible time. It is in consideration of this desire that application of the adaptive pulsing technique is limited to the final 0.016" of approach in the described embodiments.

Figure 1:
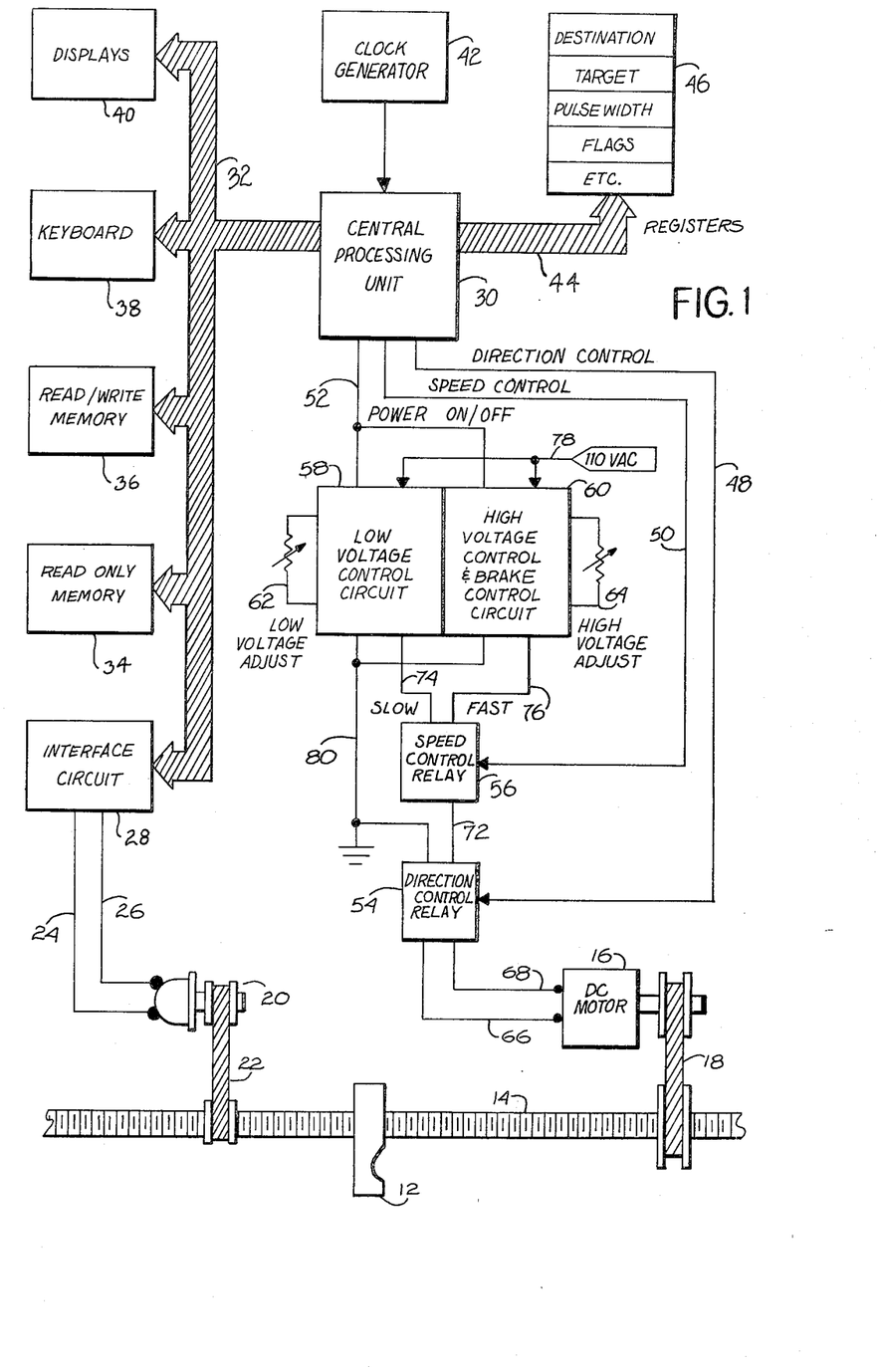
FIG. 1 is a diagrammatic showing of a machine position control system embodying the present invention.
Figure 2:
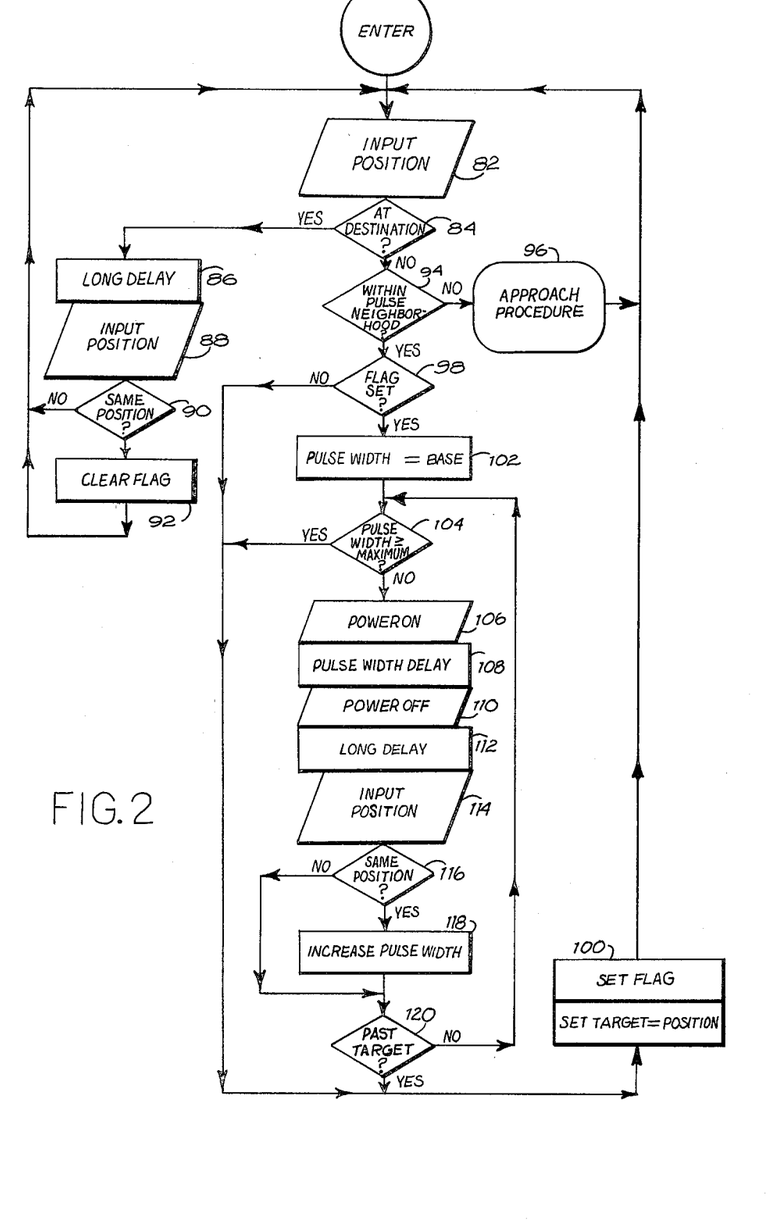
FIG. 2 is a flow, or logic, diagram which summarizes the operation of the final stage of the positioning system under the control of the microprocessor.

The preferred embodiment is shown in FIGS. 1 and 2, which disclose a microprocessor-controlled system. As shown in FIG. 1, a driven element 12 may be moved back and forth by rotation, either clockwise or counterclockwise, of a lead screw 14, which is rotated by a reversible DC motor 16, preferably of the permanent-magnet type. Any suitable drive connection, such as belt 18, may be used between motor 16 and lead screw 14.

The position of the lead screw 14, and therefore of the driven element 12, is measured by a digital transducer, preferably a shaft encoder 20, which may be driven, as the lead screw rotates, by a timing belt 22. Position signals are conveyed from the shaft encoder 20 via electrical leads 24 and 26 to an interface circuit 28. Control of operation of the motor-energized system is dependent on the position-indicating signals provided by shaft encoder 20 to interface circuit 28.

The central portion of the control network is a microprocessor computer (central processing unit) 30, which communicates electronically, via bus 32 (which carries data, address and control bits), with interface circuit 28, read only memory 34, read/write memory 36, instruction keys 38, and displays 40. A clock generator 42, which may be part of the same integrated circuit as the microprocessor 30, provides the basic timing interval for the control system. The microprocessor is shown communicating, via bus 44, with the registers 46, which may also be part of the same integrated circuit as the microprocessor 30.

The microprocessor is shown controlling three output lines—48, 50 and 52—leading, respectively, to a direction control relay 54, a speed control relay 56, and the on/off control signal input to both a low voltage control circuit 58 and a high voltage control circuit 60. The low voltage control circuit 58 has a voltage adjustment 62, and the high voltage control circuit has a voltage adjustment 64. Each voltage adjustment is preferably set initially to meet the torque requirements of the machine to which the control system is connected.

Under the control of signals from microprocessor 30 on line 48, the position of relay 54, which is shown with two leads 66 and 68 connecting to motor 16, determines whether motor 16 will move in a forward or reverse direction. Direction control relay 54 also has a grounded lead 70, and a power source lead 72 connected to the speed control relay 56. Under the control of signals from microprocessor 30 on line 50, the position of relay 56 determines whether the motor 16 is connected to the low voltage control circuit 58 via lead 74 or to the high voltage control circuit 60 via lead 76. The power source is connected to both the low and high voltage circuits by a lead 78, and both such circuits are grounded by a lead 80.

The arrangement disclosed permits a single DC motor to perform the complete task of moving element 12, under the control of microprocessor 30. As explained in Ser. No. 62,416, which is incorporated herein by reference for the purpose of providing more detailed disclosure, the position of driven element 12 is preferably indicated by shaft encoder 20, information from which is compared with command information to determine the position of lead screw 14 and element 12 relative to their selected destination.

If information at the microprocessor 30 indicates that the forward distance between the position shown by encoder 20 and the destination selected is more than a given value, the microprocessor output will cause fast forward motion of motor 16 by connecting the high voltage control 60 through relay 56, by signaling relay 54 to elect the forward direction, and by keeping power on. When the distance to destination has been reduced sufficiently, the microprocessor will turn power off; and after the motor has stopped, the microprocessor will cause relay 56 to reset, connecting the low voltage control circuit 58 to motor 16, and disconnecting the high voltage control circuit 60. Coasting of motor 16, after power has been turned off, is minimized by dynamic braking provided by a brake control circuit incorporated into the high voltage control 60. (The relative ease of providing effective dynamic braking is one of the advantages of a DC motor over an AC motor.)

The next phase is continuous slow motion of motor 16, which is initiated by microprocessor 30 causing power to turn on. Throughout the remainder of the destination approach motion, the motor 16 will be connected to low voltage control circuit 58; and operation of the motor will be manipulated by turning the power on and off under microprocessor control. When the next distance milestone is reached, as indicated by encoder information that the remaining distance to destination is less than a given value, the microprocessor will again turn power off, permitting the motor (and the elements driven thereby) to coast slightly to a stop.

It is recognized that a complete stopping of the moving elements do not, and should not, occur. Static friction, after a complete stop, might interfere with smooth additional motion of the machine. So the operating definition of "stop", in the present context, includes motion below a very low, almost infinitesimal, speed.

The next (third) phase of operation of the apparatus preferably is the proportional distance pulsing technique described in detail in Ser. No. 62,416. That phase does not have to occur, and it is not a necessary part of the present invention, but it does provide a very useful way of bringing the driven element close enough to destination to begin the final phase, which is the focus of this invention. Because this phase provides extreme accuracy, it necessarily sacrifices speed; so it is desirable to use other techniques to bring the driven element as close as possible to destination, without risking overshoot.

The final stage of settling-in motion, which is the primary concern of this invention, can best be understood by referring to the flow chart shown in FIG. 2. This demonstrates the control sequence used in providing timed driving pulses to motor 16 in such a way as to insure minimum motion with each pulse. As previously stated, the timed pulses are automatically varied, beginning with a very short pulse, and gradually increasing pulse time until some motion occurs, after which the pulse cycling process begins again with the shortest pulse.

In the flow diagram of FIG. 2, the diamond-shaped blocks are used to denote decisions, or branches; the rectangular blocks are used to denote processes; and the parallelogram blocks are used to denote input/output signals. Position is input from the interface circuit 28 in input/output block 82. The first decision block, 84, determines whether the destination has been reached. If it has, the "yes" branch leads to a long delay, block 86, after which position is again input at block 88. If movement has occurred, as determined at decision block 90, the "no" branch is taken back to the head of the loop, the entry to block 82. If no movement has occurred, the "yes" branch leads to block 92, in which a "flag" is cleared, and the head of the loop is regained. The significance of the flag is explained below.

If the destination has not been reached, the next decision encountered, block 94, leads to a determination of whether the current position is within the pulse vicinity, or neighborhood. If it is not, the "no" branch leads to block 96, labeled "Approach Procedure," which is unspecified but which initiates procedures to cause the pulse neighborhood to be reached, i.e., the procedures previously described.

If the current position is within the pulse neighborhood, the flag is tested in block 98. If it is not set, the "no" branch leads to block 100 at the end of the loop, in which the target is set equal to the current position, and the flag is set. As usual, the path terminates at the head of the loop.

If the flag has been set, the pulse width is set to its initial value in block 102. Next, in block 104 it is determined whether the pulse width (duration) has reached or exceeded its maximum value. If it has, the "yes" branch follows the path taken when the flag is not set.

If the answer in block 104 is "no", power is applied in output block 106 and a delay determined by the pulse width is observed in 108. Power is then turned off (block 110) and a long delay 112 is observed. Following this, position is input in block 114.

If no change in position has occurred (i.e., if the "same position" question is answered "yes"), as determined in decision block 116, the pulse width is increased at block 118 by a preselected increment. Next it is determined in block 120 whether the target position has been passed. If it has not, the "no" branch leads back to block 104, at the beginning of the pulse incrementing loop, and another pulse is output having a longer duration. If block 120 indicates that motion has gone past the target (the previous position), a new target is set at block 100 equal to the new position reached, the flag is set, and a path is taken back to the head of the loop at block 82.

Recapitulating the operation of the loop (blocks 106 through 120) for applying a series of duration-increasing driving pulses until the driven element has moved from its initial position, the initial step is storing of the initial position as the "target". Then a signal of fixed duration is output to the driving system. A fixed delay is observed, then the current position of the driven element is compared to the initial position. Until the initial position has been passed, a fixed increment is added to the signal duration, the signal is output, a delay observed, and position again compared. Once the initial position has been passed, the current position of the driven element is compared to the destination. Until the destination has been reached, the pulsing procedure is repeated with all values re-initialized.

Such a system has the characteristic that, with suitable values of initial signal duration, signal increment, and fixed delay, the driven element may be moved in increments of travel smaller than the resolution of the means of position measurement. Various initial pulse widths may be set at block 102. Values used have thus far ranged from about 1 millisecond to about 5 milliseconds. The duration of the pulse width increase, which is incremented at block 118, in practice has ranged from about 1 millisecond to about 5 milliseconds. It will be understood that these values should be adjusted to satisfy the operating conditions of the type of apparatus for which a given control system is designed. Generally, it is preferred that the value of the increment of increase established at block 118 remain the same, in order to avoid undue complexity. In other words, the initial pulse duration at block 102 may differ from the incremental pulse increase at block 118, but the same increment will normally be added in each successive step until the position changes.

Experience has demonstrated that the duration of the delay at block 112 should be much longer than the duration of the driving pulse. In other words, power to motor 16 generally should be turned off for a longer period than it is turned on. Suitable experimentation will develop the "duty cycle" of on-off pulsing which is optimum for a given type of machine. In equipment incorporating this invention, the lengths of the delay at block 112 have varied from about 20 milliseconds to about 50 milliseconds.

It is important for full effectiveness of the present invention that the motor 16 be a DC motor rather than an AC motor, because the variable duration adaptive pulse control system disclosed herein can be used to its full advantage only on a system employing a DC motor drive. The AC motor is by design suited to operation from an AC source, nominally the normal 110 V/220 V AC, 60/50 Hz supply line. Effective adaptive duration pulse control involves a smooth variation of pulse width without limits on the resolution of the pulse width. The AC motor imposes a major restriction on performance, in that the incremental pulse widths are fixed at the AC source rate. With a motor operating on the nominal AC line at 60 cycles, the pulse width variation would advance in 8 millisecond steps. This is a severe limitation on the application of the adaptive pulse control system, since the system would only work in those equipments where controlling time constants are large relative to the minimum time constants imposed by the AC frequency domain.

Referring back now to the particular flow chart sequence in FIG. 2, there are certain specifics to consider in greater depth. The decision concerning a pulse width maximum at block 104, while not a necessary feature, may be used as a precaution to limit the total pulse duration built up by the pulse-incrementing loop. For example, a maximum duty cycle of 30–50% (ratio of "on" time to total time) has been used in operating equipment, for the purpose of avoiding buildup of an excessive "on" pulse duration.

A very useful feature of the flow control shown in FIG. 2 is the continuous circulation of the control loops, including the loop (blocks 86 through 92) which continues to circulate after block 84 has indicated that the destination has been reached. Experience has shown that, at least with certain types of equipment, there is a significant possibility that the driven element will be moved off its final position, either accidentally or as a result of loading or other normal use. Such an event would displace the driven element from its destination position, if it were not for the self-correcting loop.

Figure 3:
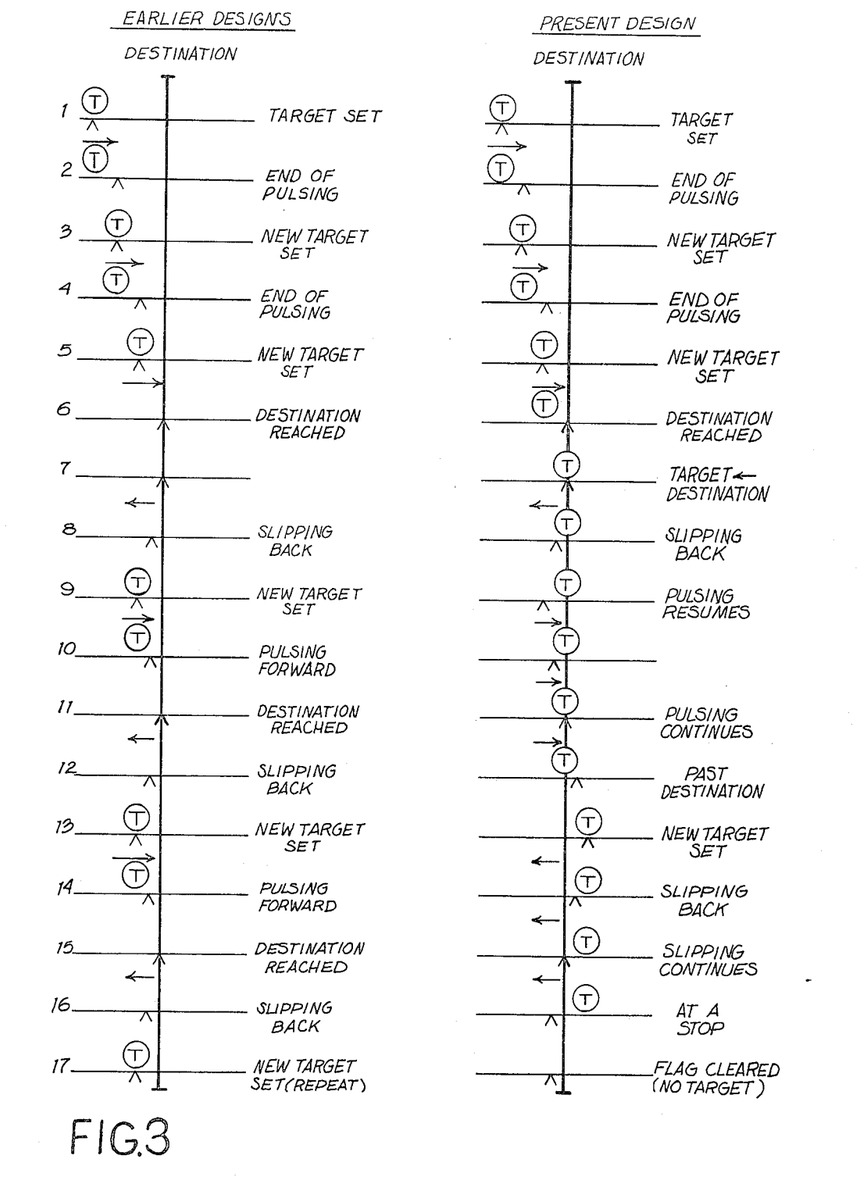
FIG. 3 is a representation of the positions, and targets, of the driven element near its destination, comparing the results in different system designs.

FIG. 3 illustrates an important, but subtle, aspect of the sequence disclosed in the flow chart of FIG. 2. In certain earlier versions of the development, either of two problems were encountered due to an apparent inherent tendency of certain machines to "slip back" slightly after destination has been reached. It is not understood why this phenomenon occurs, but it has been observed in numerous installations. The sequence of steps shown in FIG. 2 compensates for the problem.

Referring to FIG. 3, the two vertical lines marked "destination" indicate the final desired position, the line on the right being used to illustrate operation of the system disclosed herein, and the line on the left being used to illustrate operation of earlier systems in the development program. The horizontal lines are used to chart successive positions of the driven element (shown by the caret " ∧ "), successive positions of the target (shown by the symbol ⓣ ), and the direction of motion (shown by the arrow). First considering the left destination, titled "Earlier Designs", we see that the target is set at the current position on line 1. On line 2, the position has moved from the target closer to the destination, and on line 3 a new target has been set at the new position. Lines 4 and 5 repeat the sequence. On lines 6 and 7, the position has reached the destination; no new target has been set because the reaching of destination has taken control away from the pulsing loop. On line 8, the position of the driven element has slipped back, or sprung back, slightly (as discussed above). At this point, in one earlier design of the control system, the final position of the driven element would have stopped at the "slip back" position, because the block indicating the destination had been reached would lead to the exit block. In a subsequent design, the oscillation shown in FIG. 3 was often encountered. As shown on line 9, a new target has been set, and on line 10 the pulsing has returned the position toward the right. Destination has again been reached on line 11. But slipping back has then occured again on lines 12 and 13; and the system has continued to oscillate, as shown on lines 13 through 17.

The manner in which the present invention overcomes this problem is shown along the vertical "destination" line at the right side of FIG. 3. Lines 1 through 5 are identical with those along the left "destination" line. However, at lines 6 and 7, after destination has been reached, the target, instead of being erased, is reset to the new position by block 100 (FIG. 2), before the path leads back to block 84 which determines that destination has been reached. At this point, instead of following a path to exit, as in some designs, the path goes to blocks 86, 88 and 90, where position is rechecked after a delay. If the driven element has slipped back, as shown on lines 8 and 9 of FIG. 3, the flow on FIG. 2 is back to the input position. Since the driven element is no longer at destination, pulsing will be reinstituted, but with the target now at destination, as shown on lines 7 through 12 of FIG. 3. Pulsing will therefore continue until the position passes the target, as shown on lines 12 and 13, and then establishes a new target on line 13, stopping the motor. Now the slipping back, as shown on lines 14 through 17, causes the driven element to settle in final position at or extremely close to the destination. It is assumed that the position is within the minimum distance of measurement resolution from the target, thereby causing a "yes answer" at block 90 (FIG. 2), and clearing the flag at 92, so that no target is set.

From the foregoing description of FIG. 3, it can be seen that the use of target setting block 100 at the bottom of the pulsing loop, and the use of the recirculating loop of blocks 86 through 92 provides a significant functional benefit.

The type of encoder used (see 20 in FIG. 1) has been changed from the absolute encoder disclosed in Ser. No. 62,416 to an incremental, or "quadrature", encoder. The incremental encoder is both less expensive, and capable of finer measurement, than the absolute encoder, but it does necessitate substantially more sophisticated circuitry to maintain correct information as to the current position of the driven element. The measuring accuracy with an incremental encoder can be conveniently extended to a resolution of 0.00025 inch.

Figure 4:
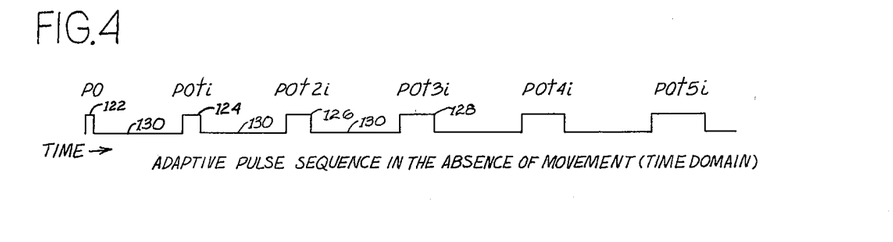
FIG. 4 shows, on a time scale, the duration-increasing adaptive pulsing available during the final stage.
Figure 5:
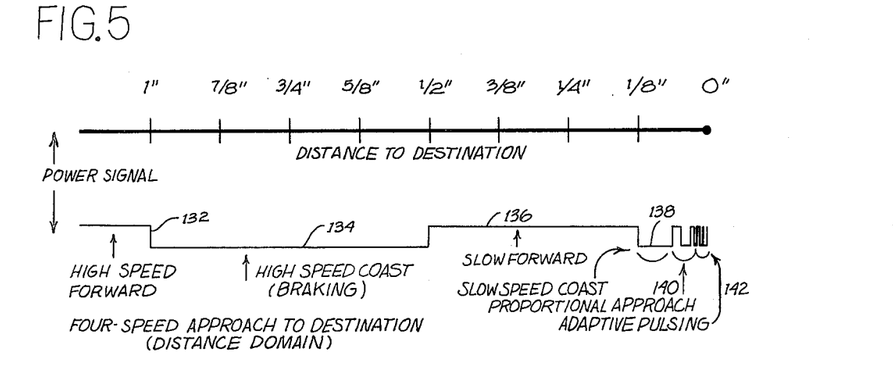
FIG. 5 shows, on a distance scale, the relationship of the four stages of driven element motion.
Figure 6:
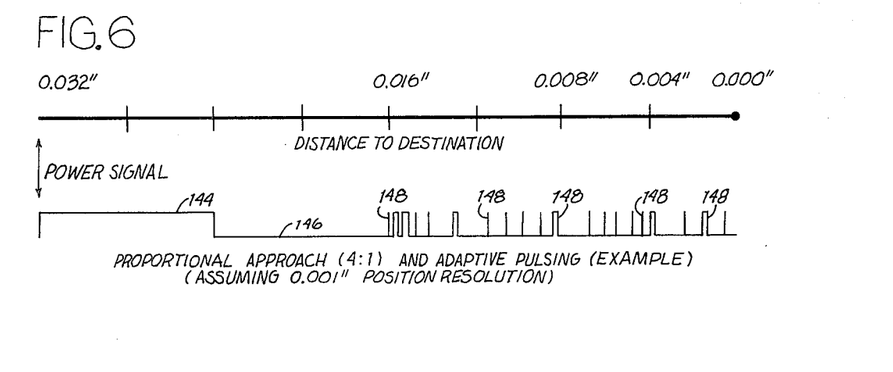
FIG. 6 shows, on a distance scale, a typical series of final stage pulses.

FIGS. 4 through 6 illustrate the pulse width relationships. In FIG. 4, where the horizontal dimension and pulse widths represent time, the pulse-duration-increasing sequence of the final setting in phase is shown. The first actuating pulse 122 at the left has a duration, or width, equal to $P_0$, the basic time selected for the initial pulse in the final phase. The second actuating pulse 124 has a duration equal to $P_0+i$, with "i" representing the selected time increment used in increasing the pulse if the previous pulse has not caused motion to a measurably new forward position. The third pulse 126 has a duration of $P_0+2i$; the forth pulse 128 has a duration of $P_0+3i$; and so on through the increments of increase needed to cause motion to a new forward position. The delays, or "off" times, between pulses, which are equal to one another and are substantially longer than the actuating pulses, are indicated by the numeral 130.

In FIG. 5, where the horizontal dimension and pulse widths represent distance, the relative distances traveled during succesive phases of the positioning movement are illustrated. The end of the high speed forward pulse is shown at 132; coasting after turn off of the high speed phase is shown at 134; the driving pulse of the continuous slow speed phase is shown at 136; and the coasting after turn off of the continuous slow speed phase is shown at 138. Next the proportional pulsing approach, which is disclosed in Ser. No. 62,416, is shown at the bracketed position indicated by numeral 140. And, finally, the incrementally-increasing-timed-pulsing final phase disclosed in the present application is shown at the bracketed position indicated by numeral 142. The distances from destination at which the various stages begin and end can, of course, be varied to suit the operating requirements of the equipment whose positioning is being controlled.

FIG. 6 shows a greatly enlarged version of the final pulsing approach, again using the horizontal dimension to indicate distance. The pulse at 144 is assumed to be the final pulse in the proportional approach (Ser. No. 62,416), followed by a coasting movement at 146. Then, at approximately 0.016 inch from destination, the incrementally-increasing-timed-pulsing disclosed in the present application takes over and finishes the movement to destination, as indicated by the sequence of numerous pulses 148. As shown, a single pulse of basic duration may be all that is required to move the driven element (or keep it moving), or a sequence of pulses of increasing duration may be required. The frictional forces to be overcome will often vary at different points of the table (or other support) along which the driven element is moved; and other variations in needed driving effort may occur because of the operating environment. These variations are accommodated without causing the driven element to overshoot its destination, because of the variable adaptive duration of the driving pulses.

Figure 7:
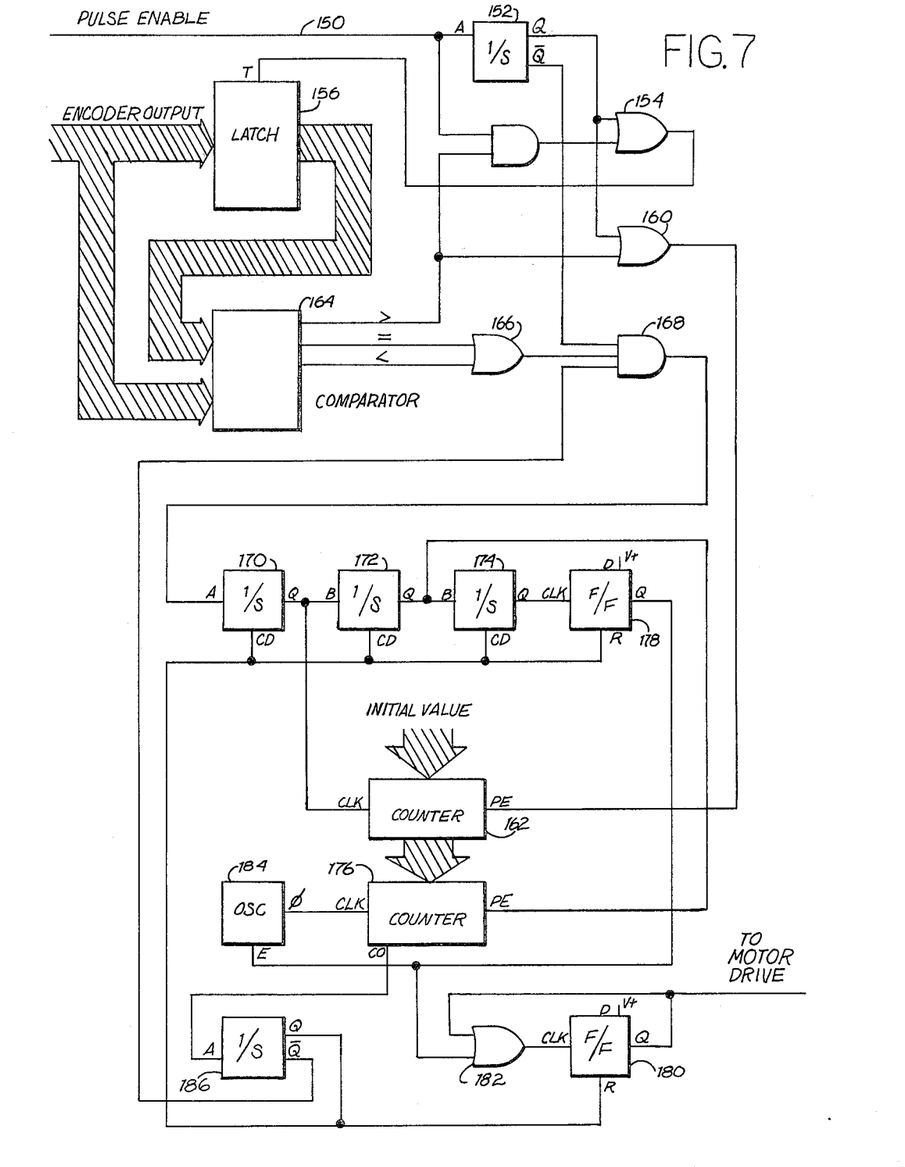
FIG. 7 is a circuit diagram of a hard-wired version of the invention.

While the embodiment of FIGS. 1 and 2 is preferred because of its relative simplicity and ease of system integration, it is also possible to accomplish a similar final stage settling-in motion with a hard-wired version, as shown in FIG. 7.

The pulse circuit of FIG. 7 is enabled and initialized by the pulse enable input, 150, which may be provided by a circuit as described in Ser. No. 62,416. The pulse enable signal will trigger one-shot 152, which, via OR gate 154, sets latch 156 with the current encoder output 158, and presets counter 162 via OR gate 160. At the beginning of each pulse cycle the latched value and the current value of the encoder output will be identical, and the equal (=) output of digital comparator 164 will be true, triggering one-shot 170 via OR gate 166 and AND gate 168. The output of one-shot 170 causes counter 162 to increment, following which one-shot 172 is triggered, which presets counter 176 to the value of counter 162. Next one-shot 174 is triggered, setting flip-flop 178 which in turn sets flip-flop 180 via OR gate 182 and turns the motor on. Flip-flop 178 also enables the gated oscillator 184, which provides a clock signal to counter 176.

The motor runs while counter 176 counts down to zero, after which the carry output triggers one-shot 186, thereby resetting flip-flop 180, and turning off the signal to motor 16. One-shot 186 provides a relatively long delay during which the motor signal remains off, and flip-flops 178 and 180, and one-shots 170, 172, and 174, are reset.

If the driven element has moved forward, the greater than (>) output of comparator 164 will become true, causing latch 156 to hold a new value forward of the previous value, and presetting counter 162 to its initial value. If no forward motion is detected by the comparator, the latched encoder output is retained and counter 162 will again be incremented at the end of the pulse from one-shot 186, which will result in a longer motor "on" pulse during the next pulse cycle.

From the foregoing description it will be readily apparent that both the embodiment of FIGS. 1 and 2, and the embodiment of FIG. 7, provide a final stage settling-in motion which obtains an accuracy determined by the resolution capability of the measuring means. This is accomplished by providing for an incremental pulse width increase if no motion occurs on the preceding pulse. Also the arrangement provides (a) that pulse control is continued until a stop at destination has occurred, and (b) that the last position achieved will be retained as a control for the next pulse cycle.

The following claims are intended not only to cover the specific embodiments disclosed, but also to cover the inventive concepts explained herein with the maximum breadth and comprehensiveness permitted by the prior art.

What is claimed is:

1. In a positioning system for moving a driven element precisely to a destination, in combination with (a) a direct current motor which moves the driven element in response to on-off driving pulses and which is capable of exerting variable amounts of moving effort on the driven element depending on the duration of the driving pulses; (b) means for measuring the position of the driven element and its distance from the destination; and (c) means for causing the motor to move the driven element to the vicinity of the destination relatively quickly:

means for providing to the motor a first short duration driving pulse once the driven element has reached the vicinity of the destination;

means for determining whether said pulse has moved the driven element toward the destination;

means for providing to the motor successive driving pulses in a pulsing cycle, each pulse in a cycle having a slightly longer duration than the previous pulse, until the driven element has moved toward the destination; and means for beginning the next pulsing cycle with a pulse having the short duration of the first pulse after each measured movement of the driven element toward the destination.

2. The positioning system combination of claim 1 which also includes:

target setting means for setting each new position of the driven element at the end of one pulsing cycle as a target for the next pulsing cycle.

3. The positioning system combination of any of claims 1 or 2 which also includes:

means for automatically reinitiating driving pulses to the motor if the position of the driven element is caused inadvertently to move away from its previously attained destination position.

4. The positioning system combination of any of claims 1 or 2 wherein the time between successive driving pulses is at least as long as the longest pulse available in each pulsing cycle.

5. For use with a positioning system for moving a driven element precisely to a destination, which has a direct current motor to move the driven element in response to driving pulses and which is capable of exerting variable amounts of moving effort on the driven element depending on the duration of the driving pulses, that method of controlling the movement of the motor which comprises:

measuring the position of the driven element and its distance from the destination;

causing the motor to move the driven element to the vicinity of the destination relatively quickly;

providing to the motor a first short duration driving pulse once the driven element has reached the vicinity of the destination;

determining whether said pulse has moved the driven element toward the destination;

providing to the motor successive driving pulses in a pulsing cycle, each pulse in a cycle having a slightly longer duration than the previous pulse, until the driven element has moved toward the destination; and beginning the next pulsing cycle with a pulse having the short duration of the first pulse after each measured movement of the driven element toward the destination 6. The movement controlling method of claim 5 which also includes:

setting each new position of the driven element at the end of one pulsing cycle as a target for the next pulsing cycle.

7. The movement controlling method of any of claims 5 or 6 which also includes:

automatically reinitiating driving pulses to the motor if the position of the driven element is caused inadvertently to move away from its previously attained destination position.

8. The movement controlling method of any of claims 5 or 6 wherein the time between successive driving pulses is at least as long as the longest pulse available in each pulsing cycle.

9. A destination-finding control system for a motor which moves a driven element, comprising:
   means for generating motor actuating pulses each having a predetermined duration and being spaced from successive pulses by a predetermined duration;
   means for determining after each actuating pulse whether forward motion has been measured;
   means for incrementally increasing the duration of successive actuating pulses until such forward motion has been measured;
   means for determining after each forward motion whether the destination has been reached; and
   means for repeating the foregoing sequence of such timed actuating pulses until the destination has been reached.

10. That method of causing a driven element to be moved by a motor control system to a predetermined destination, which includes the steps of:
    generating motor actuating pulses each having a predetermined duration and being spaced from successive pulses by a predetermined duration;
    determining after each actuating pulse whether forward motion has been measured;
    incrementally increasing the duration of successive actuating pulses until such forward motion has been measured;
    determining after each forward motion whether the destination has been reached; and
    repeating the foregoing sequence of such timed actuating pulses until the destination has been reached.

11. The positioning system combination of claim 2 in which the target-setting means sets the first new position measured upon reaching destination as the target of the next pulsing cycle.

12. The movement controlling method of claim 6 in which the first new position measured upon reaching destination is set as the target of the next pulsing cycle.

13. In a positioning system for moving a driven element precisely to a destination in response to variable width command signal pulses, in combination with (a) a direct current motor which exerts moving force on the driven element whenever the motor is on, and which is on when the command signal is present and off when the command signal is absent; and (b) means for measuring the position of the driven element and comparing it to the destination:
    means for setting an interim target position of the driven element once the vicinity of the destination has been reached;
    means for applying a first short duration command signal pulse to the motor;
    means for determining whether said pulse has caused the driven element to move sufficiently to cancel the interim target position;
    means for providing successive command signal pulses in a pulsing cycle, each pulse having a slightly larger duration than the previous pulse, until the driven element has moved sufficiently to cancel the interim target position;
    means for setting a new interim target position upon cancellation of the previous interim target position; and,
    means for beginning a new pulsing cycle after each setting of a new interim position until the destination has been reached.

14. The positioning system combination of claim 13 wherein each pulsing cycle begins with a pulse of the same duration.

15. The positioning system combination of claim 13 wherein each pulse in a pulsing cycle differs in duration from the previous pulse in that cycle by the same increment of increase.

16. The positioning system combination of claim 13 wherein each new interim target position is closer to the destination than the previous interim target position.

17. The positioning system combination of any of claims 13 through 16, wherein a final target position is set when the destination is reached.

18. The positioning system combination of any of claims 13 through 16 which also includes:
    means for automatically reinitiating command signal pulses if the position of the driven element is caused inadvertently to move away from its previously attained destination position.

19. The positioning system combination of any of claims 13 through 16 wherein the time between successive command signal pulses is at least as long as the longest pulse available in each pulsing cycle.

20. For use with a positioning system for moving a driven element precisely to a destination in response to variable width command signal pulses, which system includes (a) a direct current motor which exerts moving force on the driven element whenever the motor is on, and which is on when the command signal is present and off when the command signal is absent; and (b) means for measuring the position of the driven element and comparing it to the destination; that method of controlling the motor which comprises the following steps:
    setting an interim target position of the driven element once the vicinity of the destination has been reached;
    applying a first short duration command signal pulse to the motor;
    determining whether said pulse has caused the driven element to move sufficiently to cancel the interim target position;
    providing successive command signal pulses in a pulsing cycle, each pulse having a slightly larger duration than the previous pulse, until the driven element has moved sufficiently to cancel the interim target position;
    setting a new interim target position upon cancellation of the previous interim target position; and,
    beginning a new pulsing cycle after each setting of a new interim position until the destination has been reached.

21. The motor controlling method of claim 20 wherein each pulsing cycle begins with a pulse of the same duration.

22. The motor controlling method of claim 20 wherein each pulse in a pulsing cycle differs in duration from the previous pulse in that cycle by the same increment of increase.

23. The motor controlling method of claim 20 wherein each new interim target position is closer to the destination than the previous interim target position.

24. The motor controlling method of any of claims 20 through 23, wherein a final target position is set when the destination is reached.

25. The motor controlling method of any of claims 20 through 23 which also includes:
automatically reinitiating command signal pulses if the position of the driven element is caused inadvertently to move away from its previously attained destination position.

26. The motor controlling method of any of claims 20 through 23 wherein the time between successive command signal pulses is at least as long as the longest pulse available in each pulsing cycle.

* * * * *